SIMULTANEOUS FREQUENCY AND SPACE SCANNING SYSTEM

Filed April 11, 1963 2 Sheets-Sheet 1

INVENTOR.
RABINDRA N. GHOSE

BY Edward O. Ansell

ATTORNEY

INVENTOR.
RABINDRA N. GHOSE
BY Edward O. Ansell
ATTORNEY

United States Patent Office 3,251,062

Patented May 10, 1966

3,251,062

SIMULTANEOUS FREQUENCY AND SPACE SCANNING SYSTEM

Rabindra N. Ghose, Los Angeles, Calif., assignor to Space-General Corporation, El Monte, Calif., a corporation of California Filed Apr. 11, 1963, Ser. No. 272,337

6 Claims. (Cl. 343—100)

The present invention relates to an improved antenna arrangement for frequency searching and space scanning.

It is oftentimes desirable, as in the case of reconnaissance and surveillance system applications, to detect a signal whose location and exact frequency are not known. Such a detection process involves simultaneous frequency scanning and spatial searching and although devices are known that perform such functions independently, attempts in the past to effectively combine these functions to produce simultaneous frequency and spatial searching have posed considerable problems.

It is, therefore, an object of the present invention to provide a single system capable of searching for a signal both as to frequency and location and to do so simultaneously.

Prior art adaptive antenna array systems, particularly those described in Patent 3,036,210 to F. W. Lehan et al., are capable of continuous automatic spacial scanning until a coherent phase related signal is detected by each of a plurality of antenna elements, whereupon the system automatically locks onto the coherent signal, and through the use of phase locked loop networks, produces a maximized signal output and tracks the signal source by automatically varying the phase of each network. Such systems provide effective spacial scanning. The Lehan-type spacial scanning system includes basically an antenna array with an individual phase lock loop circuit for each antenna element and a common phase reference local oscillator connected as the second input to each phase lock loop. The system automatically locks each antenna circuit in frequency and phase to the incoming signal, and the output of each antenna circuit is combined to produce a maximized signal output despite the phase changes of individual antenna elements occasioned by movement of the signal source or receiver. One limitation noted has been that the operativeness of such systems depends upon the coherent signal appearing within the relatively narrow frequency response band of the phase lock loop circuits. The controlling factor is characteristically the limited dynamic frequency range of the voltage controlled oscillators of the phase lock loops. It is, therefore, here proposed that in addition to the spacial scanning arrangement of the prior art that the system be made to frequency scan as well. This is accomplished by the addition to the typical elements of the spacial scanning system of a variable frequency reference oscillator, a narrow band frequency gate in each of the antenna circuits controlled by the reference oscillator along with a circuit for controlling the sweep of the reference oscillator and terminating its frequency variation when the coherent signal output of the system is maximized.

One feature of this invention resides in the combination of closed loop frequency and spacial scanning in an antenna system.

A second feature of this invention involves the presence of a frequency scanning system controlled by the spacial scanning system in an adaptive antenna array.

Another feature of the invention is in the use of the variable frequency oscillator controlled by the output of the phase lock loop in a phase lock loop adaptive array to provide broad range frequency as well as spacial tracking.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 3(*a*) is a flow chart illustrating the several waveforms appearing in the FIGURE 2 network.

Figure 1:
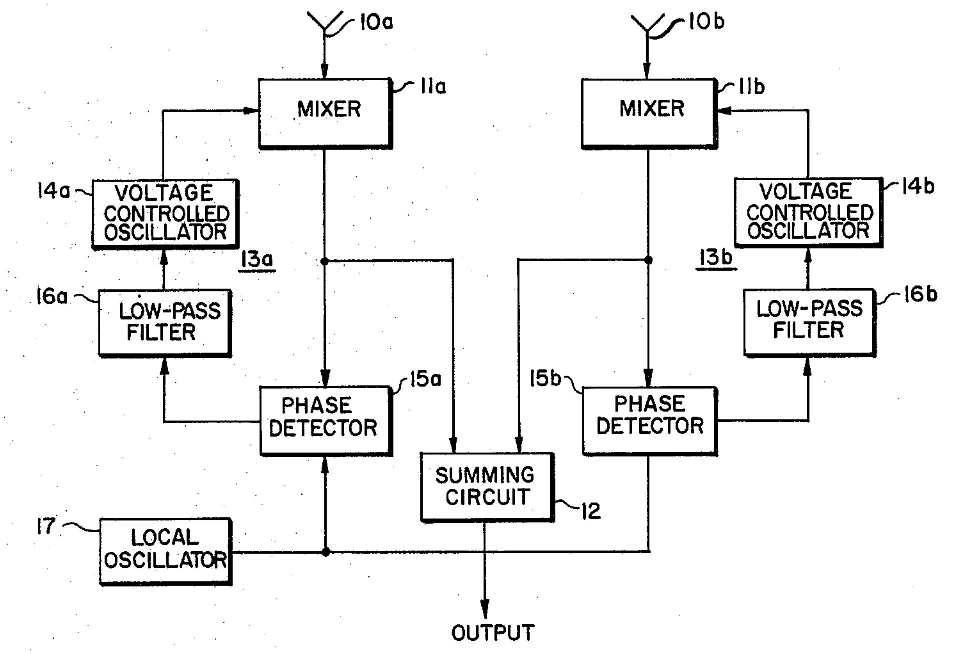
FIG. 1 PRIOR ART
FIGURE 1 is a block diagram of a known space scanning antenna arrangement for spatially locating a signal.

In referring to the drawings in which like elements are similarly designated, it should be mentioned at the outset that the antenna arrangement of FIGURE 1 is known to the art, as was mentioned above, and may be found in the patent entitled "Electronically Scanning Antenna Employing Phase-Locked Loops To Produce Optimum Directivity," invented by F. W. Lehan et al., Patent No. 3,036,210, issued May 22, 1962. However, it is presented here for description once again because it is deemed that an understanding of the FIGURE 1 arrangement is essential to an understanding of the present invention. Accordingly, the antenna arrangement of FIGURE 1 includes a pair of antennas **10*a* and 10*b* respectively, coupled through a pair of mixer circuits 11*a* and 11*b* to both a summing circuit 12 and a pair of phase-locked loop networks, generally designated 13*a* and 13*b*. More specifically, antenna 10*a* is connected to a first input terminal of mixer 11*a*, a voltage controlled oscillator 14*a* being connected to the second input terminal of the mixer. The output end of mixer 11*a* is connected to the first of two input terminals to a phase-detector circuit 15*a* and is also connected to one of two inputs to summing circuit 12. Phase detector 15*a* is coupled at its output end through a low-pass filter 16*a* to the input end of the above-said voltage-controlled oscillator. Similarly, antenna 10*b* is connected to the first input terminal of mixer 11*b*, the second input terminal of this mixer being connected to the output end of a voltage-controlled oscillator 14*b*. Phase detector 15*b* and a low-pass filter 16*b* complete the loop of phase-locked network 13*b* filter 16*b* being connected between the output end of the phase detector and the input end of the voltage-controlled oscillator. The output end of mixer 11*b* is connected both to the first of two input terminals to phase detector 15*b* and to the second of the two input terminals to summing circuit 12. The antenna arrangement is completed by a local oscillator 17 whose output is coupled to the second input terminals of phase detectors 15*a* and 15*b***.

In operation, when a signal at frequency $f_1$ is intercepted by antennas **10*a* and 10*b*, the signal out of antenna 10*a* is applied to the first input to mixer 11*a* and the signal out of antenna 10*b* is applied to the first input to mixer 11*b*. At the same time, signals respectively generated at frequencies $f_2$ and $f_3$ by voltage-controlled oscillators 14*a* and 14*b* are respectively applied to the second inputs to mixers 11*a* and 11*b***. Each of the mixers heterodynes the signals applied thereto to produce an intermediate-frequency signal at a frequency which may be either the sum or difference between the frequencies of the signals applied to it; in this case, the difference frequency.

Due to the fact that the signals at frequency $f_1$ out of antennas 10_a_ and 10_b_ are out of phase with each other and due to the further fact that the signals respectively generated by voltage-controlled oscillators 14_a_ and 14_b_ are of different frequency; namely, frequencies $f_2$ and $f_3$, it will be readily accepted that the intermediate-frequency signals respectively produced by mixers 11_a_ and 11_b_ are also not of the same frequency initially. In other words, the intermediate-frequency signals initially out of mixers 11_a_ and 11_b_ are respectively produced at frequencies $f_4$ and $f_5$.

The mixer signals are applied to summing circuit 12 wherein they are instantaneously added to produce a resultant output signal that is initially quite small due to the out-of-phase or out-of-frequency condition of the intermediate-frequency signals. At the same time that the signals produced at the outputs of mixers 11_a_ and 11_b_ are applied to summing circuit 12, they are also respectively applied to phase detectors 15_a_ and 15_b_ at the first inputs thereof. The reference signal generated by local oscillator 17 at a fixed frequency $f_0$, on the other hand, is applied to the second inputs to phase detectors 15_a_ and 15_b_. As may be inferred, the phase detectors compare the phases of the signals applied to them, and in response thereto, they produce error signals that are respectively smoothed by low-pass filters 16_a_ and 16_b_ and thereafter applied to voltage-controlled oscillators 14_a_ and 14_b_. As may be expected, the amplitude and polarity of each error signal is determined by the relative phase difference between the signals applied to the associated phase detector circuit.

The mentioned error signals cause a shift in the phase or frequency of the signals respectively generated at frequencies $f_2$ and $f_3$ by voltage-controlled oscillators 14_a_ and 14_b_ and, as a result of this shift in phase, the two intermediate-frequency signals respectively produced by mixers 11_a_ and 11_b_ are brought somewhat more into frequency or phase alignment with each other; that is, the total phase angle between them is reduced. The signal out of voltage-controlled oscillators 14_a_ and 14_b_ continue to be shifted in frequency or phase until the mixer signals are in phase with the reference signal out of local oscillator 17 and, therefore, in phase with each other. When this occurs, the output signal produced by summing circuit 12 is of maximum amplitude. At this point, all error signals are reduced to zero level so that the antenna system remains fixed in this condition of maximum output. However, should the signal source change its position relative to the antenna system, then the system will readjust itself in the manner described to again provide a maximum output signal or, stated differently, maximum directivity and gain.

In the event that no transmitted signal is received, then noise signals will govern the system and the system will hunt or search the directivity of the system being built up first in one direction and then in another, thereby providing a spatial scan of the skies. When a signal does then appear on the scene, the system locks onto the signal as described above.

Figures 3, 3A:
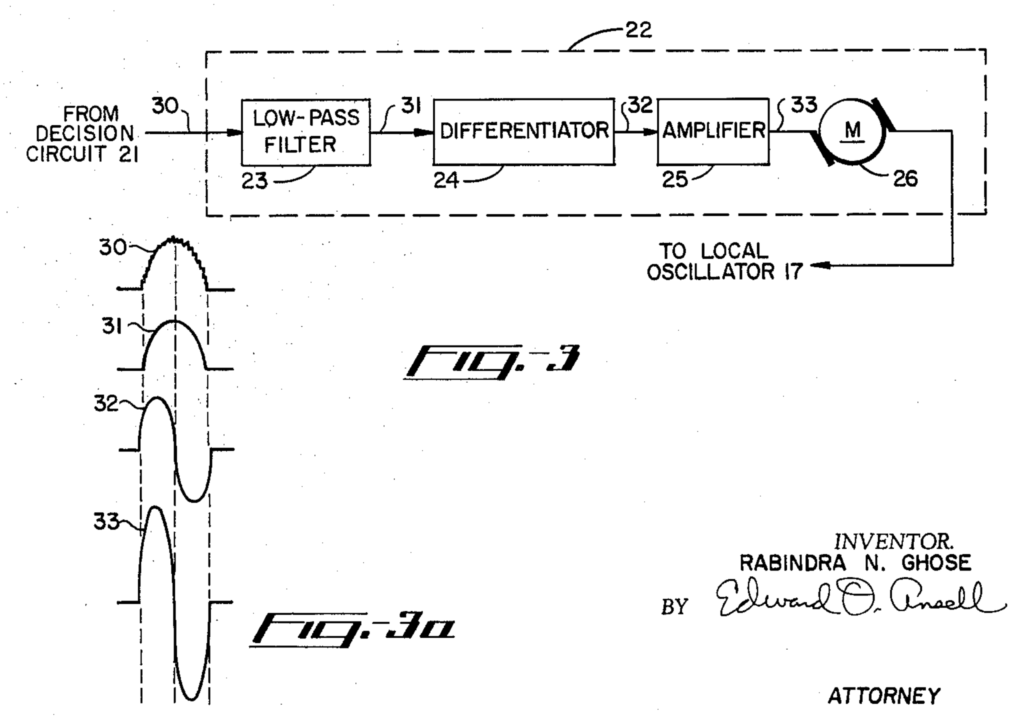
FIGURE 3 is a more detailed block diagram of a compensating network represented in FIGURE 2.
Figure 2:
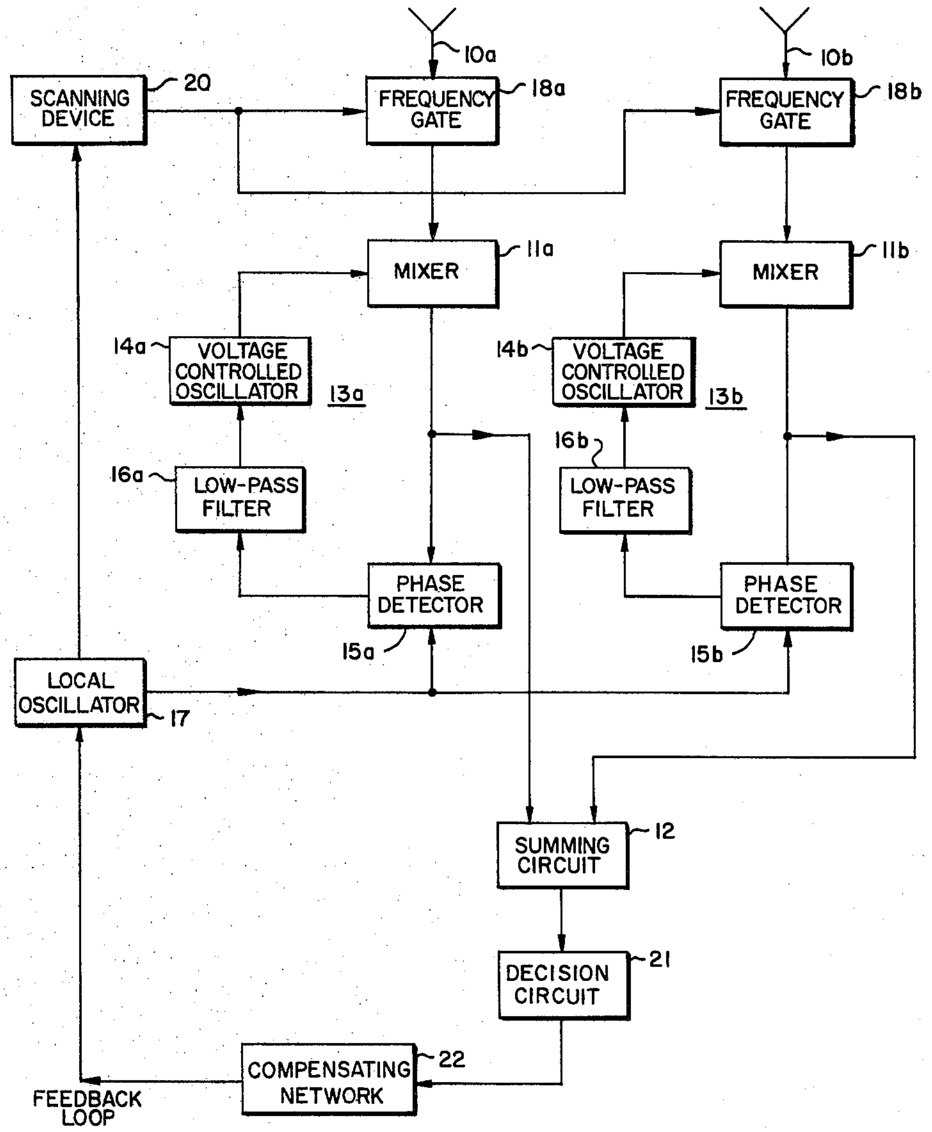
FIGURE 2 is a block diagram of an antenna system in which the spatially scanning arrangement of FIGURE 1 has been modified and combined with frequency scanning apparatus to provide both functions simultaneously.

Having thus described the manner in which spatial searching is achieved, reference is now made to FIGURE 2 wherein the spatial scanning apparatus of FIGURE 1 is combined with additional apparatus designed for frequency scanning, the elements of this combination being arranged in a novel manner to produce frequency scanning and spatial scanning simultaneously. As shown in FIGURE 2, the frequency scanning apparatus added to the FIGURE 1 antenna arrangement is shown to include a pair of frequency gates 18_a_ and 18_b_, frequency gate 18_a_ being coupled between antenna 10_a_ and mixer 11_a_ and, similarly, frequency gate 18_b_ being coupled between antenna 10_b_ and mixer 11_b_. Also included is a scanning device 20 connected between local oscillator 17 and frequency gates 18_a_ and 18_b_. In essence, the frequency gates are nothing more than variable narrow bandpass filters whose center frequencies are varied by the scanning device. A typical example of such a filter for use in the microwave frequency range is described in the Microwave Journal, Volume 6, 1963, page 72, et. seq., wherein the pass band of the filter is shifted by changing the magnetic field produced by a solenoid. Mechanically tuned filters are equally suitable for this application. The scanning device itself is controlled by the local oscillator and may be either mechanical or electronic in nature, a number of scanning devices of either type being generally available. In the case of an electrically tuned filter such as described in the Microwave Journal publication cited above, the scanning device produces the necessary unidirectional current to operate the field solenoid. The unidirectional current would be derived from the local oscillator output, the level of the unidirectional current being a function of the frequency deviation of the local oscillator from a predetermined reference frequency. The conventional FM discriminator provides just such type of operation. If the band pass filter is mechanically tunable, then the scanning device, e.g. FM discriminator, can be used to drive a servo motor coupled to the frequency gates.. The exact implementation of the frequency gate and scanning device depends in part upon the frequency range of the operation of the entire system and the selection of the electronic as compared to the mechanical control. A decision circuit 21, which may be a threshold limiter, is coupled to receive the output signal from summing circuit 12 and, finally, a compensating network 22 is connected between decision circuit 21 and local oscillator 17. The function of the compensating network, which will be described in greater detail later, is to slow down and ultimately stop the local oscillator when optimum results are being obtained. This occurs when the local oscillator is at the frequency where the maximum signal level appears at the output of the summing circuit 12. Whenever that occurs, the decision circuit threshold has been exceeded and a pulse is applied by the decision circuit 21 to the compensating network. The component parts that may be included in compensating network 22 are shown in FIGURE 3 and include a low-pass filter 23, a differentiating circuit 24, a power amplifier 25 and a motor 26 connected in series in the order named between decision circuit 21 and local oscillator 17.

In operation, as was previously explained, noise signals initially govern the system which, in response thereto, hunts or searches in the sense that the directivity of the system builds up first in one direction and then in another, thereby providing a spatial scan of the skies. When a signal at an unknown frequency and coming in from an unknown direction is received by antennas 10_a_ and 10_b_ and respectively applied to frequency gates 18_a_ and 18_b_ which, it was previously mentioned, are variable narrow-bandpass filters whose center frequencies are varied by scanning device 20, the unknown signal will fail to pass through frequency gates 18_a_ and 18_b_ to mixers 11_a_ and 11_b_ until the center frequency of these gates substantially coincides with the frequency of the above-said unknown signal; that is to say, until the bandpass characteristic of the gates includes the frequency of the incoming signal. Until the above-said coincidence occurs, however, spatial scanning will continue.

It will be recognized that at some point in the repetitive scan cycle of frequency gates 18_a_ and 18_b_, the unknown signal will pass through to mixers 11_a_ and 11_b_. When this happens, phase-locked loops 13_a_ and 13_b_ are effective to produce maximum directivity in the direction of the incoming signal for reasons that have heretofore been explained and that are extensively treated in Patent Number 3,036,210 which is incorporated herein by reference. More specifically, as the phase-locked loops build up the directivity and, therefore, the gain of the system toward a maximum, the magnitude of the signal out of summing circuit 12 correspondingly builds up toward a maximum and when its amplitude exceeds the threshold level of decision circuit 21, a pulse is applied by the decision circuit 21 to compensating network 22. In response thereto, the compensating network slows down and ultimately stops the frequency sweeping of the local oscillator 17, with the result that scanning device 20 sweep is also stopped. Decision circuit 21 produces a pulse output each time there is momentary coincidence between the pass band of the frequency gates and the incoming signal. The pulse from the decision circuit tends to inhibit and slow down the frequency scanning of the local oscillator 17. A threshold is present in the decision circuit 21 so that the random noise level is insufficient to retard the frequency scan rate. Thus, the passage of the signal of unknown frequency through gates **18*a* and 18*b* ultimately has the effect of fixing the position of the local oscillator and of the scanning device, so that the unknown signal thereafter continues to pass through said gates. Furthermore, as will shortly be seen, the positions of these elements are fixed so that the signals out of gates 18*a* and 18*b* and, therefore, out of summing circuit 12** are optimum.

It is thus seen from the description presented above that a network embodying the present invention will search for signals of unknown frequency and, when it encounters one, will "lock in" on it to thereafter provide continued reception of it. At the same time, such a network will scan space for signals that may be coming in from unknown directions and here again, when it encounters one, it "locks in" on it so that the maximum directivity of the network is thereafter in the direction of the signal source. In this way, there is provided a single system capable of searching for a signal both as to frequency and direction and that can do so simultaneously.

Reference is now made to FIGURE 3 wherein compensating network 22 of FIGURE 2 is shown in greater detail, and to FIGURE 3(*a*) wherein are shown the signals appearing at various points in the compensating circuit. In its operation, a pulse out of decision circuit 21 is applied to low-pass filter 23 which takes out its high frequency components, as is shown in the figure wherein the pulse applied to the filter is designated 30 and the same pulse, minus its high frequency components, is designated 31. Pulse 31 is applied to differentiating circuit 24 which, as its name implies, differentiates pulse 31 to produce signal 32, signal 32 thereafter being amplified as signal 33 by amplifier 25. Signal 33 is sinusoidal in nature and, as will be recognized by those skilled in the art, the positive loop of signal 33 corresponds to or, stated differently, is produced in response to the upward or rising first half of pulse 31 while the negative loop of signal 33 similarly corresponds to the downward or decaying second half of pulse 31. Hence, the point whereat signal 33 crosses the axis corresponds to the peak or maximum point of value for pulse 31.

Signal 33 is applied to motor 26 which operates along the straight portion of signal 33; that is to say, along that portion of signal 33 that lies between its positive and negative peaks. For example, amplifier 25 may be coupled to the field circuit of motor 26 so that the motor field and, therefore, the direction of rotation of the motor will depend on which segment of the straight portion of signal 33 the motor is operating on. In other words, the motor will rotate in one direction when the current flowing through its field circuit corresponds to positive or above-the-axis segment of signal 33 and will rotate in the reverse direction when the current corresponds to the negative or below-the-axis segment of signal 33. Consequently, motor 26, in its operation, tends toward the crossover point of signal 33 which, as was previously mentioned, corresponds to the peak value of pulse 31 which, as was also previously mentioned, corresponds to optimum operation of the system, both as to frequency and directivity.

Having thus described the invention, what is claimed is:

1. A simultaneous frequency and space scanning system comprising: first and second broadband antennas; a frequency scanning network including first and second narrow variable bandpass circuits respectively coupled to said first and second antennas and means for varying the center bandpass frequencies of said first and second circuits at a predetermined rate through a predetermined range of frequencies, said first and second circuits being operable to pass a signal at an unknown frequency when the center bandpass frequencies of said first and second circuits substantially coincides with the unknown frequency of said signal; apparatus for producing a reference signal; and first and second networks respectively coupled to said first and second circuits and to said apparatus for respectively comparing the phase of said reference signal with the phases of the signals passed by said first and second circuits, said first and second networks repectively including first and second phase detector circuits for producing first and second error signals whose amplitudes and polarities respectively correspond to the phase differences between said passed signals and said reference signal, said first and second networks respectively further including first and second additional circuit arrangements responsive to said first and second error signals for shifting the phases of said passed signals until they are in phase with said reference signal, whereby they are in phase with each other.

2. The system defined in claim 1 wherein said first and second networks are respectively first and second phase-locked loop networks.

3. A simultaneously frequency and space scanning system comprising: first and second broadband antennas for intercepting a signal transmitted from a distant signal source at an unknown frequency and respectively producing first and second signals in response thereto; first and second narrow and variable bandpass filters respectively coupled to said first and second antennas; means for varying the center bandpass frequencies of said first and second filters at a predetermined rate through a predetermined range of frequencies, said first and second filters being operable to pass said first and second signals when said center bandpass frequencies are substantially the same as the unknown frequency; a summing circuit for adding together said first and second signals to produce a single output signal; apparatus for producing a reference signal; and first and second phase-locked circuits respectively coupled to said first and second filters, to said apparatus, and to said summing circuit, said phase-locked circuits comparing the phase of said reference signal with the phases of said first and second signals to produce first and second error signals whose amplitudes and polarities respectively correspond to the phase angles between said reference and said first and second signals, said first and second phase-locked circuits respectively including first and second means responsive to said first and second error signals for shifting the phases of said first and second signals until they are in phase with said reference signal, whereby optimum directivity and gain is provided in the direction of the received signal.

4. The system defined in claim 3 wherein said bandpass frequency varying means includes a scanning device coupled to said first and second filters and operable to vary the center bandpass frequencies thereof according to the frequency of said reference signal; said apparatus that produces said reference signal being coupled to said scanning device; and a network coupled between said summing circuit and said apparatus for varying the frequency of said reference signal according to the magnitude of said single output signal.

5. The system defined in claim 3 wherein said first and second phase-locked circuits include first and second voltage-controlled oscillators for respectively generating third and fourth signals, the phases of said third and fourth signals being affected by the amplitude and polarity of said first and second error signals respectively applied to said oscillators; first and second mixer circuits respectively coupled to said first and second filters and to said first and second voltage-controlled oscillators, said first and second mixer circuits being operable in response to the first and second signals passed by said filters and to said third and fourth signals to respectively produce fifth and sixth signals, the phase of said fifth signal being determined by the phases of said first and third signals and the phase of said sixth signal being determined by the phases of said second and fourth signals; said reference signal apparatus; and first and second phase-detector circuits coupled between said first and second mixer circuits, respectively, and said reference signal apparatus for comparing the phase of said reference signal with the phases of said fifth and sixth signals, said first and second phase-detector circuits respectively being operable in response to said compared signals to produce said first and second error signals, said first and second phase-detector circuits respectively being coupled to said first and second voltage-controlled oscillators for application thereto of said first and second error signals.

6. A simultaneous frequency and space scanning system comprising: first and second broadband antennas for intercepting a signal transmitted from a distant signal source at an unknown frequency and respectively producing first and second signals in response thereto; first and second narrow and variable bandpass filters respectively coupled to said first and second antennas; a scanning device coupled to said first and second filters and operable to vary the center bandpass frequencies thereof according to the frequency of a reference signal applied thereto; a variable reference signal source coupled to said scanning device; first and second voltage-controlled oscillators for respectively generating third and fourth signals whose phases are affected by the amplitude and polarity of voltages applied thereto; first and second mixer circuits respectively coupled to said first and second filters and to said first and second voltage-controlled oscillators, said first and second mixer circuits being operable in response to the first and second signals passed by said filters and to said third and fourth signals to respectively produce fifth and sixth signals whose phases are respectively determined by said first and third signals and said second and fourth signals; first and second phase-detector circuits coupled between said first and second mixer circuits, respectively, and said reference signal apparatus for comparing the phase of said reference signal with the phases of said fifth and sixth signals, said first and second detector circuits respectively being operable in response to said compared signals to produce first and second error voltages, said first and second detector circuits respectively being coupled to said first and second voltage-controlled oscillators for application thereto of said first and second error voltages; a summing circuit for adding together said fifth and sixth signals to produce a single output signal; and a network coupled between said summing circuit and said variable reference signal source for varying the frequency of said reference signal according to the magnitude of said single output signal, said network including means for fixing the frequency of said reference signal when said output signal is substantially of maximum magnitude, whereby optimum directivity and gain is provided in the direction of the received signal.

References Cited by the Examiner

UNITED STATES PATENTS

| | | | |
|---|---|---|---|
| 2,445,562 | 7/1948 | Camein et al. | 325—490 X |
| 3,133,283 | 5/1964 | Ghose | 343—100 |
| 3,202,992 | 8/1965 | Kent et al. | 343—117 X |

LEWIS H. MYERS, *Primary Examiner.*

CHESTER L. JUSTUS, *Examiner.*

H. C. WAMSLEY, *Assistant Examiner.*